(12) United States Patent
Daunais

(10) Patent No.: US 8,393,924 B1
(45) Date of Patent: Mar. 12, 2013

(54) WATERCRAFT CONTROL SYSTEM

(75) Inventor: Jean Daunais, Granby (CA)

(73) Assignee: BRP US Inc., Sturtevant, WI (US)

( * ) Notice: Subject to any disclaimer, the term of this patent is extended or adjusted under 35 U.S.C. 154(b) by 252 days.

(21) Appl. No.: 12/732,763

(22) Filed: Mar. 26, 2010

Related U.S. Application Data

(60) Provisional application No. 61/164,170, filed on Mar. 27, 2009.

(51) Int. Cl.
B63H 3/00 (2006.01)

(52) U.S. Cl. .......................................................... 440/50

(58) Field of Classification Search .............. 114/114 R, 114/144 B, 144 E, 145 R; 440/1, 49, 50, 440/84, 87; 123/349, 403; 701/21; 416/1
See application file for complete search history.

(56) References Cited

U.S. PATENT DOCUMENTS

| | | | |
|---|---|---|---|
| 1,196,682 | A | 8/1916 | Harriss |
| 2,663,277 | A | 12/1953 | Armstrong et al. |
| 4,836,809 | A | 6/1989 | Pelligrino |
| 5,005,507 | A | 4/1991 | Dyer |
| 5,085,302 | A | 2/1992 | Kriesels |
| 5,433,634 | A | 7/1995 | Nakayama et al. |
| 5,494,464 | A | 2/1996 | Kobayashi et al. |
| 5,603,644 | A | 2/1997 | Kobayashi et al. |
| 5,607,332 | A | 3/1997 | Kobayashi et al. |
| 6,350,163 | B1 | 2/2002 | Fujimoto |
| 6,350,164 | B1 | 2/2002 | Griffith et al. |
| 6,554,663 | B2 | 4/2003 | Neisen |
| 6,634,774 | B2 * | 10/2003 | Redding ........................ 362/477 |
| 6,994,046 | B2 * | 2/2006 | Kaji et al. ................. 114/144 R |
| 7,131,385 | B1 | 11/2006 | Ehlers et al. |
| 7,275,493 | B1 * | 10/2007 | Brass ............................ 114/272 |
| 7,473,076 | B2 * | 1/2009 | Rosenkranz et al. ............. 416/1 |
| 7,481,688 | B2 | 1/2009 | Kobayashi |
| 7,674,144 | B2 | 3/2010 | Bourret et al. |
| 7,708,609 | B2 | 5/2010 | Plante et al. |
| 7,841,915 | B2 | 11/2010 | Bourret et al. |
| 7,901,258 | B1 * | 3/2011 | McChesney et al. ............. 440/1 |
| 7,901,259 | B2 | 3/2011 | Bourret et al. |
| 8,177,594 | B2 | 5/2012 | Dagenais et al. |
| 2006/0054067 | A1 | 3/2006 | Hoberman et al. |
| 2008/0215230 | A1 | 9/2008 | Yamada et al. |

FOREIGN PATENT DOCUMENTS

EP 0515650 B1 9/1995

* cited by examiner

Primary Examiner — Lars A Olson
Assistant Examiner — Anthony Wiest
(74) Attorney, Agent, or Firm — BCF LLP

(57) ABSTRACT

A watercraft has an engine, a propeller, an electronic control unit (ECU), a throttle actuator, and a velocity control actuator separate from the throttle actuator. The velocity control actuator is movable between an inactive position and a plurality of active positions. When the velocity control actuator is in the inactive position, the ECU controls a speed of the engine based at least in part on a degree of actuation of the throttle actuator. When the velocity control actuator is moved from the inactive position to one of the plurality of active positions, the ECU reduces the speed of the engine based at least in part on a degree of actuation of the velocity control actuator independently of the degree of actuation of the throttle actuator. A method of controlling a watercraft is also described.

13 Claims, 10 Drawing Sheets

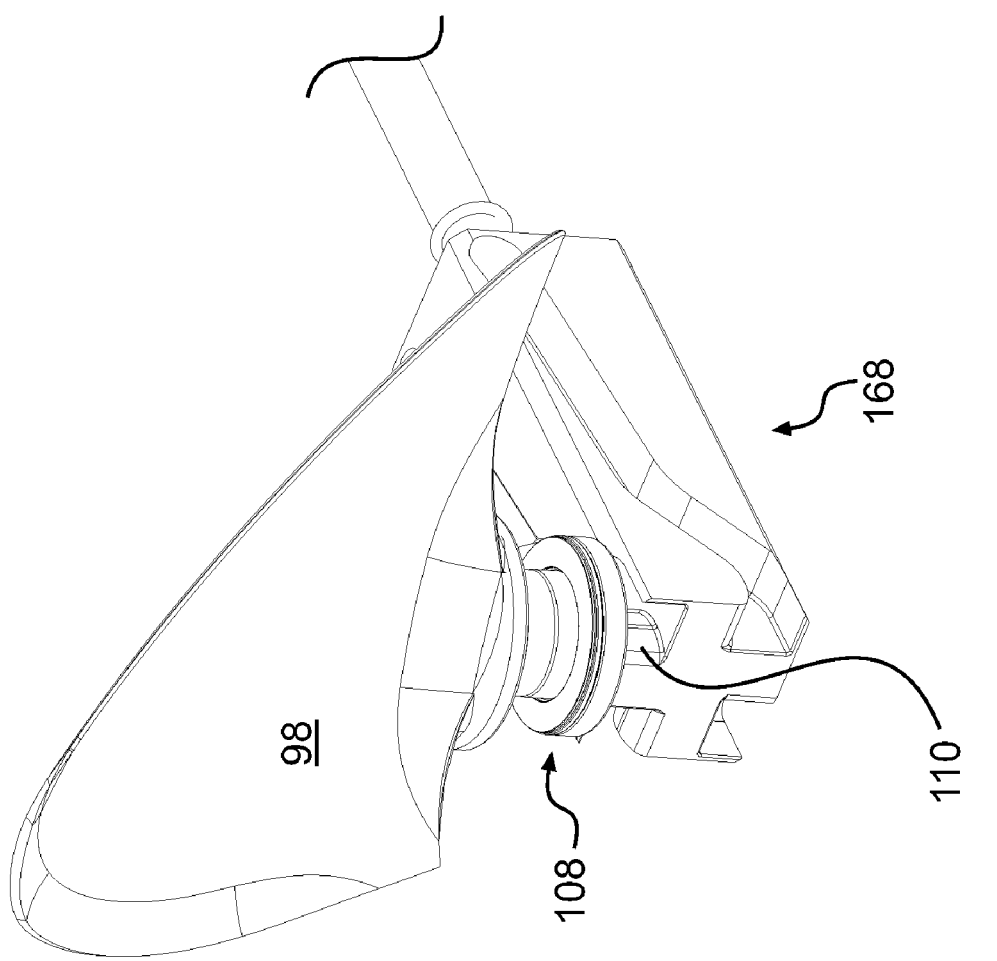

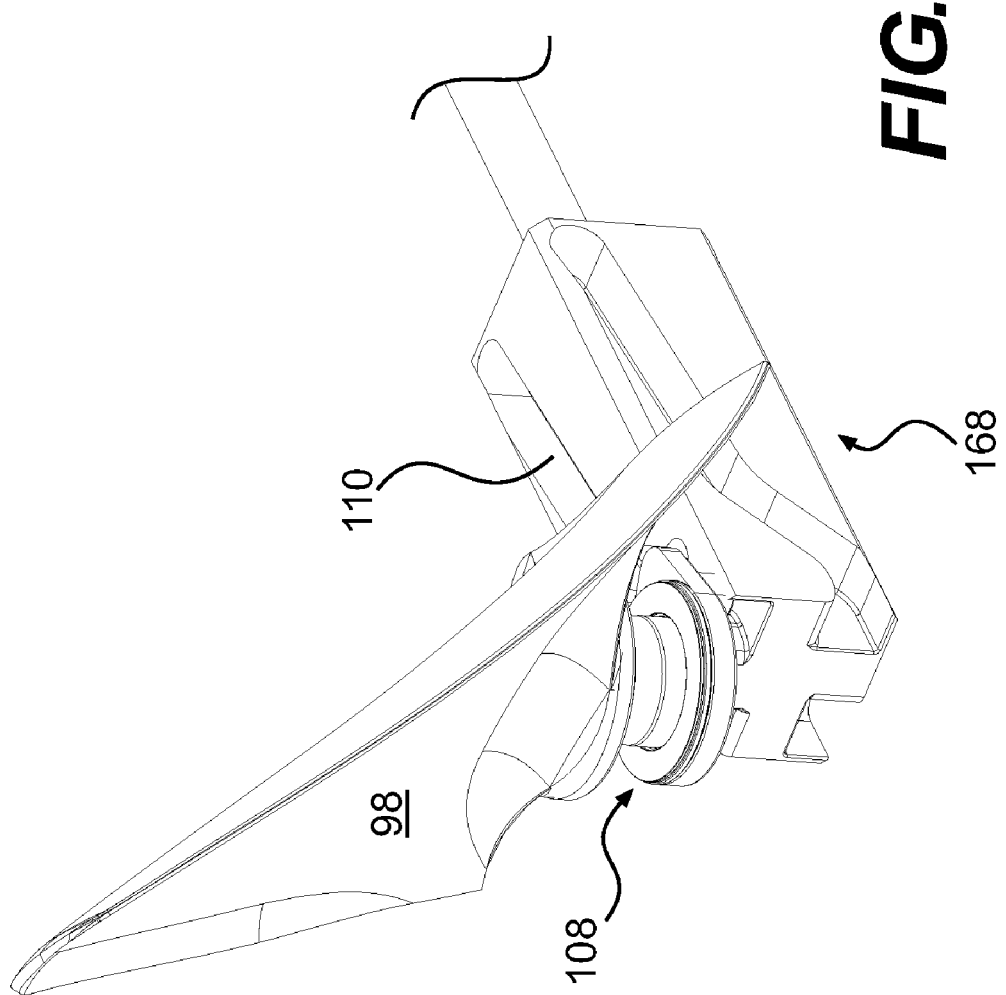

WATERCRAFT CONTROL SYSTEM

CROSS-REFERENCE

The present application claims priority to U.S. Provisional Patent Application No. 61/164,170, filed Mar. 27, 2009, the entirety of which is incorporated herein by reference.

FIELD OF THE INVENTION

The present invention relates to a system and method for controlling a watercraft.

BACKGROUND OF THE INVENTION

Many boats and other watercraft are propelled by one or more propellers that are driven by one or more inboard or outboard engines or a stern drive system. Each propeller typically has three or four blades, but may have as few as two or more than four. The base of each blade is mounted at an angle, or pitch, relative to a radial plane transverse to the axis of rotation of the propeller shaft. Some propellers have blades with a variable pitch, so that the pitch can be adjusted to provide increased efficiency, faster acceleration, or other desired performance characteristics at a wider range of speeds than blades having a fixed pitch. The variable pitch mechanism may be either manually actuated or regulated by an electronic control unit (ECU) based on one or more operating parameters of the watercraft such as vehicle speed and propeller rotation speed.

From time to time, the user of a watercraft may desire to slow down the watercraft quickly, for example to avoid striking an obstacle in the water. One method of slowing down a watercraft is to manually move the throttle actuator to an idle speed position, disengage the engine from the propeller or turn the engine off completely, and allow the friction created by the hull in the water to slow the forward motion of the watercraft. However, the user may wish to slow down the watercraft more quickly.

The user of a watercraft may alternatively attempt to rapidly decelerate the watercraft by quickly moving the throttle lever from a forward thrust position to a reverse thrust position. This method may cause damage to various components of the watercraft, particularly if the engine speed is relatively high. In particular, reversing the direction of rotation of the propeller at high speeds may cause stress on the propeller blades and hub, and the shift from forward gear to reverse gear at high engine speeds may damage the transmission gears. In addition, it may be difficult for the user to control the degree of deceleration of the watercraft. Furthermore, steering to avoid an obstacle with thrust directed in the reverse direction may be difficult or counter-intuitive to some users.

Therefore, there is a need for a watercraft providing an alternative system for slowing down.

There is also a need for a method of causing the deceleration of a watercraft having these properties.

SUMMARY OF THE INVENTION

It is an object of the present invention to ameliorate at least some of the inconveniences present in the prior art.

It is a further object of the present invention to provide a system for decelerating a watercraft that is simple for a driver to operate.

It is a further object of the present invention to provide a watercraft that allows a driver of the watercraft to reduce the speed of the engine of the watercraft independently of a throttle actuator of the watercraft.

It is a further object of the present invention to provide a watercraft having a variable pitch propeller capable of generating a force resulting in the deceleration of the watercraft.

It is a further object of the present invention to provide a watercraft allowing a driver to decelerate the watercraft without removing his hands from the steering device.

It is a further object of the present invention to provide a watercraft allowing a driver to decelerate the watercraft without disengaging the throttle actuator.

It is a further object of the present invention to provide a method of reducing the speed of an engine of a watercraft independently of a throttle actuator of the watercraft.

It is a further object of the present invention to provide a method of causing the deceleration of a watercraft having a variable pitch propeller by varying the pitch of the propeller.

In one aspect, the invention provides a watercraft having a hull, a deck disposed on the hull, an engine supported by at least one of the hull and the deck, a propeller operatively connected to the engine to propel the watercraft, the propeller having a plurality of blades, an electronic control unit (ECU) electrically connected to the engine, a steering device disposed on the deck for steering the watercraft, a throttle actuator disposed on the deck and being electrically connected to the ECU, and a velocity control actuator separate from the throttle actuator. The velocity control actuator is disposed on the deck and is electrically connected to the ECU. The velocity control actuator is movable between an inactive position and a plurality of active positions. The plurality of active positions corresponds to a plurality of degrees of actuation of the velocity control actuator. When the velocity control actuator is in the inactive position, the ECU controls a speed of the engine based at least in part on a degree of actuation of the throttle actuator. When the velocity control actuator is moved from the inactive position to one of the plurality of active positions, the ECU reduces the speed of the engine based at least in part on a degree of actuation of the velocity control actuator independently of the degree of actuation of the throttle actuator.

In a further aspect, a pitch actuator is operatively connected to the plurality of blades and is electrically connected to the ECU. The pitch actuator is operative to pivot the blades about respective pitch axes between a first pitch and a second pitch. The second pitch generates a smaller thrust than the first pitch for an equivalent engine speed. When the velocity control actuator is in the inactive position, the ECU causes the pitch actuator to place the blades at the first pitch. The first pitch is based at least in part on the degree of actuation of the throttle actuator. When the velocity control actuator is moved from the inactive position to one of the plurality of active positions, the ECU causes the pitch actuator to place the blades at the second pitch. The second pitch is based at least in part on the degree of actuation of the velocity control actuator independently of the degree of actuation of the throttle actuator.

In an additional aspect, the ECU prevents an increase in the speed of the engine when the velocity control actuator is moved from an inactive position to one of the plurality of active positions and the blades are pivoted from the first pitch to the second pitch.

In a further aspect, when the velocity control actuator is moved from the one of the plurality of active positions to the inactive position, the ECU causes the pitch actuator to pivot the blades from the second pitch to a third pitch based at least in part on a current degree of actuation of the throttle actuator.

In an additional aspect, when the velocity control actuator is moved from the one of the plurality of active positions to the inactive position, the ECU causes the pitch actuator to place the blades in a neutral pitch independently of the degree of actuation of the throttle actuator until the ECU receives a signal indicative of a change in the degree of actuation of the throttle actuator.

In a further aspect, when the velocity control actuator is in one of the plurality of active positions, the ECU receives at least one signal indicative of a current rate of deceleration of the watercraft after pivoting the blades to the second pitch. When the current rate of deceleration differs from a desired rate of deceleration, the ECU causes the pitch actuator to pivot the blades from the second pitch to a third pitch in order to obtain the desired rate of deceleration.

In an additional aspect, when the velocity control actuator is in the inactive position, the ECU causes the propeller to be at a first trim angle. The first trim angle is based at least in part on the degree of actuation of the throttle actuator. When the velocity control actuator is moved from the inactive position to one of the plurality of active positions, the ECU causes the propeller to be at a second trim angle. The second trim angle being based at least in part on the degree of actuation of the velocity control actuator and at least one performance characteristic of the watercraft independently of the degree of actuation of the throttle actuator.

In a further aspect, the velocity control actuator is a pedal.

In an additional aspect, the second pitch is a reverse pitch.

In a further aspect, the ECU momentarily boosts the speed of the engine when the pitch actuator pivots the blades from the first pitch to the reverse pitch.

In an additional aspect, at least one light is disposed on a rearward portion of the watercraft and is electrically connected to the ECU. The ECU causes the at least one light to be illuminated in response to a signal received from the ECU indicative of at least one of a deceleration of the watercraft and of the velocity control actuator being in one of the plurality of active positions.

In a further aspect, the velocity control actuator is biased toward the inactive position.

In another aspect, the invention provides a method of controlling a watercraft, comprising: controlling a speed of an engine of the watercraft based at least in part on a degree of actuation of a throttle actuator of the watercraft when a velocity control actuator of the watercraft is in an inactive position; and reducing the speed of the engine in response to the velocity control actuator being moved from the inactive position to one of a plurality of active positions. The second engine speed is based at least in part on a degree of actuation of the velocity control actuator independently of the degree of actuation of the throttle actuator.

In an additional aspect, the watercraft has a propeller with a plurality of blades. The blades are pivotable about respective pitch axes between a first pitch and a second pitch. The second pitch generates a smaller thrust than the first pitch for an equivalent engine speed. The method further comprises: placing the blades in the first pitch when the velocity control actuator of the watercraft is in the inactive position, the first pitch being based at least in part on the degree of actuation of the throttle actuator; and placing the blades in the second pitch when the velocity control actuator is moved from the inactive position to one of the plurality of active positions, the second pitch being based at least in part on the degree of actuation of the velocity control actuator independently of the degree of actuation of the throttle actuator.

In a further aspect, the method further comprises preventing an increase in the speed of the engine when the velocity control actuator is moved from an inactive position to one of the plurality of active positions and the blades are pivoted from the first pitch to the second pitch.

In an additional aspect, the method further comprises: receiving at least one signal indicative of a current rate of deceleration of the watercraft after placing the blades in the second pitch; comparing the current rate of deceleration to a desired rate of deceleration; and when the current rate of deceleration differs from the desired rate of deceleration, pivoting the blades from the second pitch to a third pitch in order to obtain the desired rate of deceleration.

In a further aspect, the method further comprises pivoting the blades from the second pitch to a third pitch in response to the velocity control actuator being moved from one of the plurality of active positions to the inactive position. The third pitch is based at least in part on the degree of actuation of the throttle lever.

In an additional aspect, the method further comprises: pivoting the blades from the second pitch to a neutral pitch in response to the velocity control actuator being moved from one of the plurality of active positions to the inactive position; and pivoting the blades from the neutral pitch to a third pitch in response to a change in the degree of actuation of the throttle lever after the velocity control actuator has been returned to the inactive position. The third pitch is based at least in part on the degree of actuation of the throttle lever.

In a further aspect, the method further comprises: placing the propeller at a first trim angle when the velocity control actuator is in the inactive position, the first trim angle being based at least in part on the degree of actuation of the throttle actuator of the watercraft; and placing the propeller at a second trim angle in response to the velocity control actuator being moved from the inactive position to one of the plurality of active positions, the second trim angle being based at least in part on the degree of actuation of the velocity control actuator independently of the degree of actuation of the throttle actuator.

In another aspect, the invention provides a watercraft having a hull, a deck disposed on the hull, an engine supported by at least one of the hull and the deck, a propeller operatively connected to the engine to propel the watercraft, the propeller having a plurality of blades, and a pitch actuator operatively connected to the plurality of blades. The pitch actuator is operative to pivot the blades about respective pitch axes between a first pitch and a second pitch. The second pitch generating a smaller thrust than the first pitch for an equivalent engine speed. The watercraft also has an electronic control unit (ECU) electrically connected to the engine and the pitch actuator, a steering device disposed on the deck for steering the watercraft, a throttle actuator disposed on the deck and being electrically connected to the ECU, and a velocity control actuator separate from the throttle actuator. The velocity control actuator is disposed on the deck and is electrically connected to the ECU. The velocity control actuator is movable between an inactive position and a plurality of active positions. The plurality of active positions correspond to a plurality of degrees of actuation of the velocity control actuator. When the velocity control actuator is in the inactive position, the ECU causes the pitch actuator to place the blades at the first pitch. The first pitch is based at least in part on the degree of actuation of the throttle actuator. When the velocity control actuator is moved from the inactive position to one of the plurality of active positions, the ECU causes the pitch actuator to place the blades at the second pitch. The second pitch is based at least in part on the degree of actuation of the velocity control actuator independently of the degree of actuation of the throttle actuator.

In an additional aspect, when the watercraft is operating at or below a predetermined speed, the second pitch is a reverse pitch for at least one of the plurality of active positions.

In the present application, terms related to spatial orientation such as forwardly, rearwardly, left, and right, should be interpreted are as they would normally be understood by a driver of a watercraft sitting thereon in a normal driving position. When these terms are used in relation to a propeller alone, they should be interpreted as they would be understood if the propeller were installed on a watercraft.

For purposes of the present application, a reverse thrust should be understood as being a negative thrust. As such, any forward thrust, regardless of its magnitude, should be considered as being greater than a reverse thrust. Similarly, a reverse thrust having a large magnitude should be considered smaller than a reverse thrust having a small magnitude.

Also for purposes of this application, a forward pitch of the propeller blades is a pitch which produces a forward thrust (i.e. a thrust which, if of sufficient magnitude, causes the watercraft to move forward) when the propeller rotates in a given direction. A reverse pitch of the propeller blades is a pitch which produces a reverse thrust (i.e. a thrust which, if of sufficient magnitude, causes the watercraft to move backward) when the propeller rotates in the same given direction.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIGS. 5A-5C are right rear perspective views taken from a rear, right side of a portion of the propeller assembly showing the cam and a propeller blade in first, second and third positions respectively;

DETAILED DESCRIPTION OF THE PREFERRED EMBODIMENTS

Figure 1:
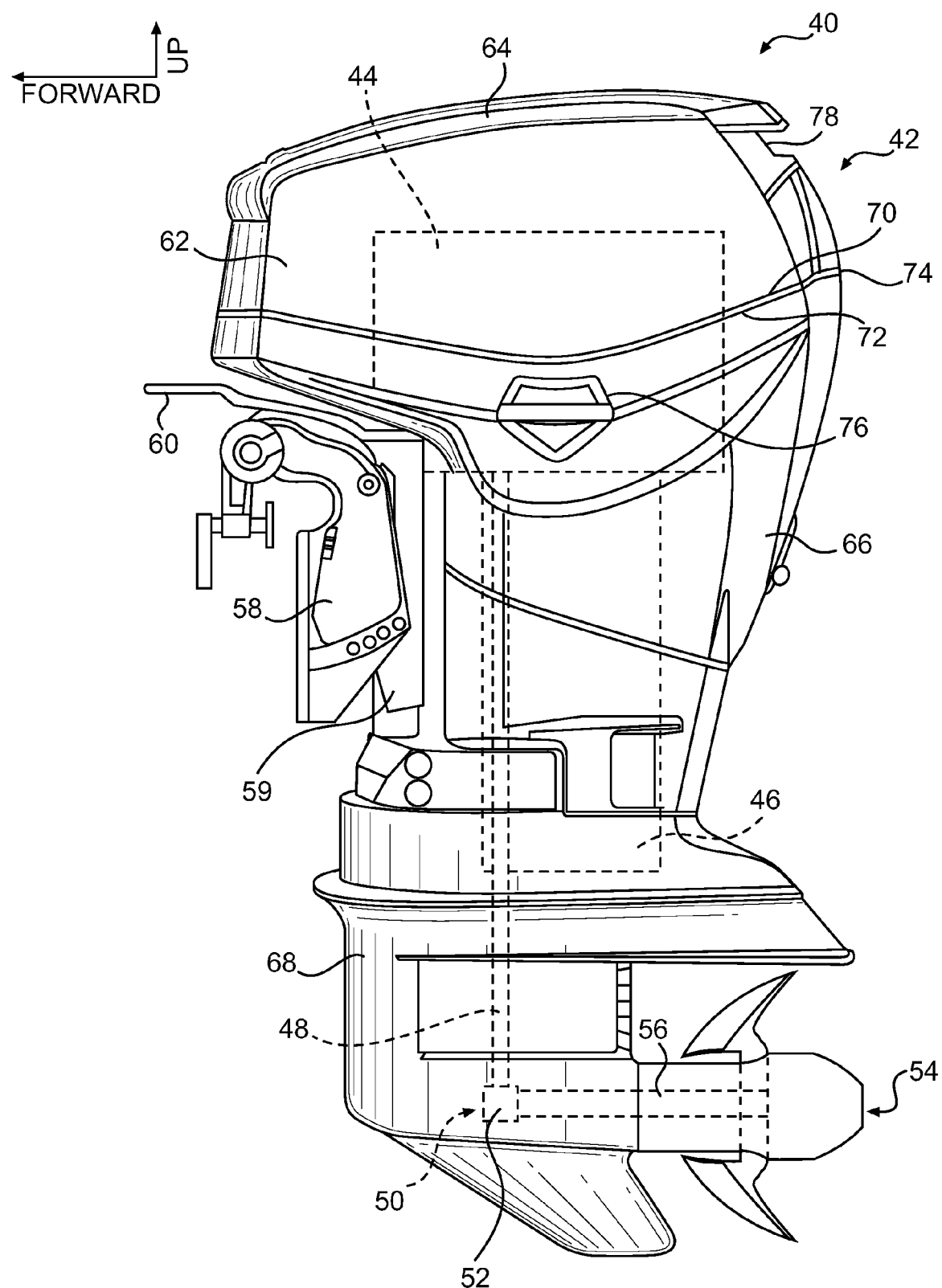
FIG. 1 is a side elevation view of a marine outboard engine having a variable pitch propeller according to the present invention.

Referring to FIG. 1, a marine outboard engine 40 will be described according to the present invention. It should be understood that the present invention is applicable to other marine applications involving propellers, such as inboard engines and stern drives.

FIG. 1 is a side view of a marine outboard engine 40 having a cowling 42. The cowling 42 surrounds and protects an engine 44, shown schematically. The engine 44 may be any suitable engine known in the art, such as an internal combustion engine. An exhaust system 46, shown schematically, is connected to the engine 44 and is also surrounded by the cowling 42.

The engine 44 is coupled to a vertically oriented driveshaft 48. The driveshaft 48 is coupled to a drive mechanism 50, which includes a transmission 52 and a bladed rotor, such as a propeller assembly 54 (shown schematically) mounted on a propeller shaft 56. The propeller shaft 56 is generally perpendicular to the driveshaft 48. The drive mechanism 50, the propeller assembly 54 and the propeller shaft 56 will be described below in further detail. Other known components of an engine assembly are included within the cowling 42, such as a starter motor and an alternator. As it is believed that these components would be readily recognized by one of ordinary skill in the art, further explanation and description of these components will not be provided herein.

Figure 6:
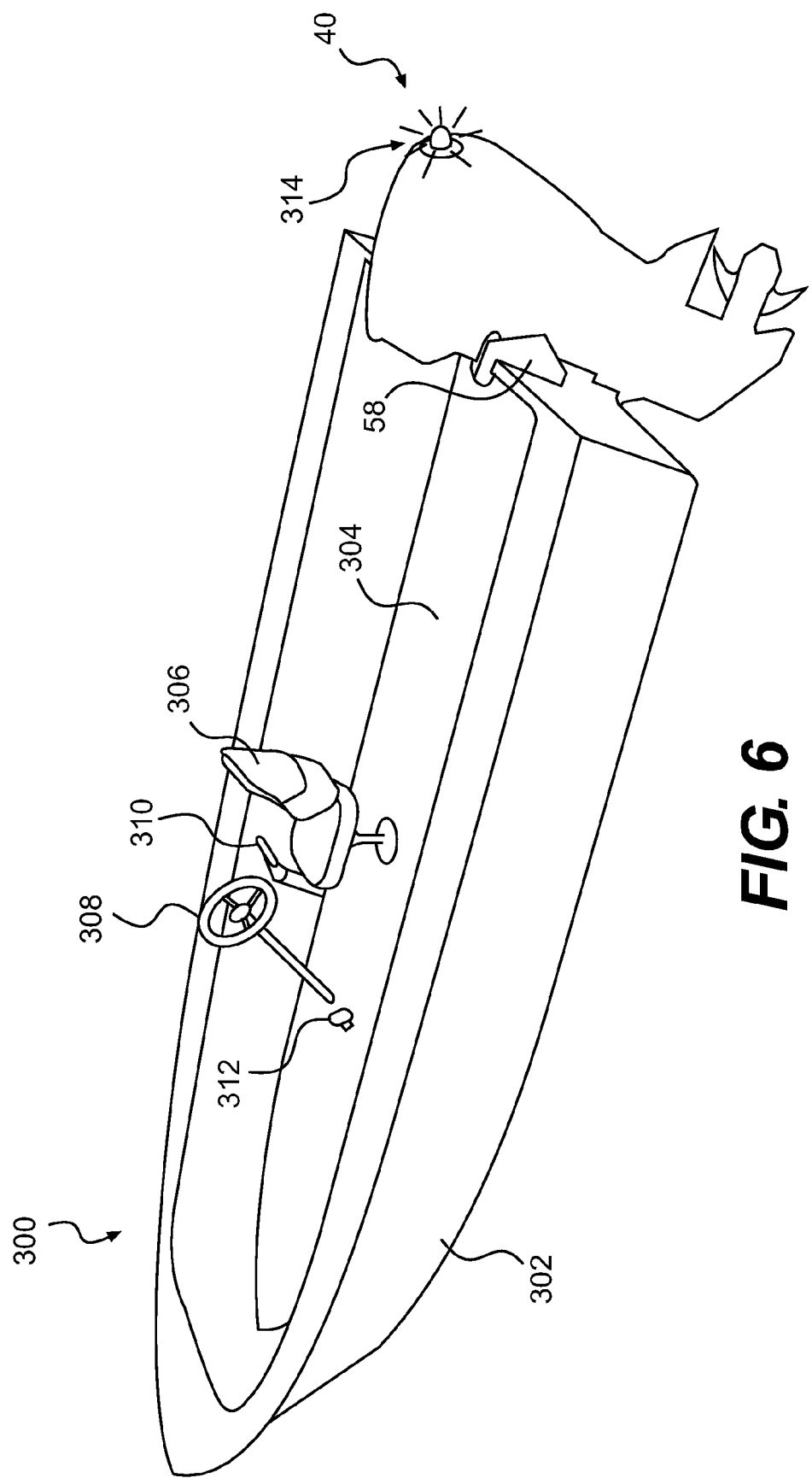
FIG. 6 is a perspective view, taken from a rear, left side, of a boat equipped with the marine outboard engine of FIG. 1.

A stern bracket 58 is connected to the cowling 42 via the swivel bracket 59 for mounting the outboard engine 40 to a watercraft such as the boat 300 of FIG. 6. The stern bracket 58 can take various forms, the details of which are conventionally known.

A linkage 60 is operatively connected to the cowling 42, to allow steering of the outboard engine 40 when coupled to a steering mechanism of a boat, as will be described below in further detail.

The cowling 42 includes several primary components, including an upper motor cover 62 with a top cap 64, and a lower motor cover 66. A lowermost portion, commonly called the gear case 68, is attached to the exhaust system 46. The upper motor cover 62 preferably encloses the top portion of the engine 44. The lower motor cover 66 surrounds the remainder of the engine 44 and the exhaust system 46. The gear case 68 encloses the transmission 52 and supports the drive mechanism 50, which will be described below in further detail.

The upper motor cover 62 and the lower motor cover 66 are made of sheet material, preferably plastic, but could also be metal, composite or the like. One suitable composite is fiberglass. The lower motor cover 66 and/or other components of the cowling 42 can be formed as a single piece or as several pieces. For example, the lower motor cover 66 can be formed as two lateral pieces that mate along a vertical joint.

A lower edge 70 of the upper motor cover 62 mates in a sealing relationship with an upper edge 72 of the lower motor cover 66. A seal 74 is disposed between the lower edge 70 of the upper motor cover 62 and the upper edge 72 of the lower motor cover 66 to form a watertight connection.

A locking mechanism 76 is provided on at least one of the sides of the cowling 42. Preferably, locking mechanisms 76 are provided on each side of the cowling 42.

The upper motor cover 62 is formed in two parts, but could also be a single cover. As seen in FIG. 1, the upper motor cover 62 includes an air intake portion 78 formed as a recessed portion on the rear of the cowling 42. The air intake portion 78 is configured to prevent water from entering the interior of the cowling 42 and reaching the engine 44. Such a configuration can include a tortuous path. The top cap 64 fits over the upper motor cover 62 in a sealing relationship and preferably defines a portion of the air intake portion 78.

Alternatively, the air intake portion 78 can be wholly formed in the upper motor cover 62 or even the lower motor cover 66.

Figure 2:
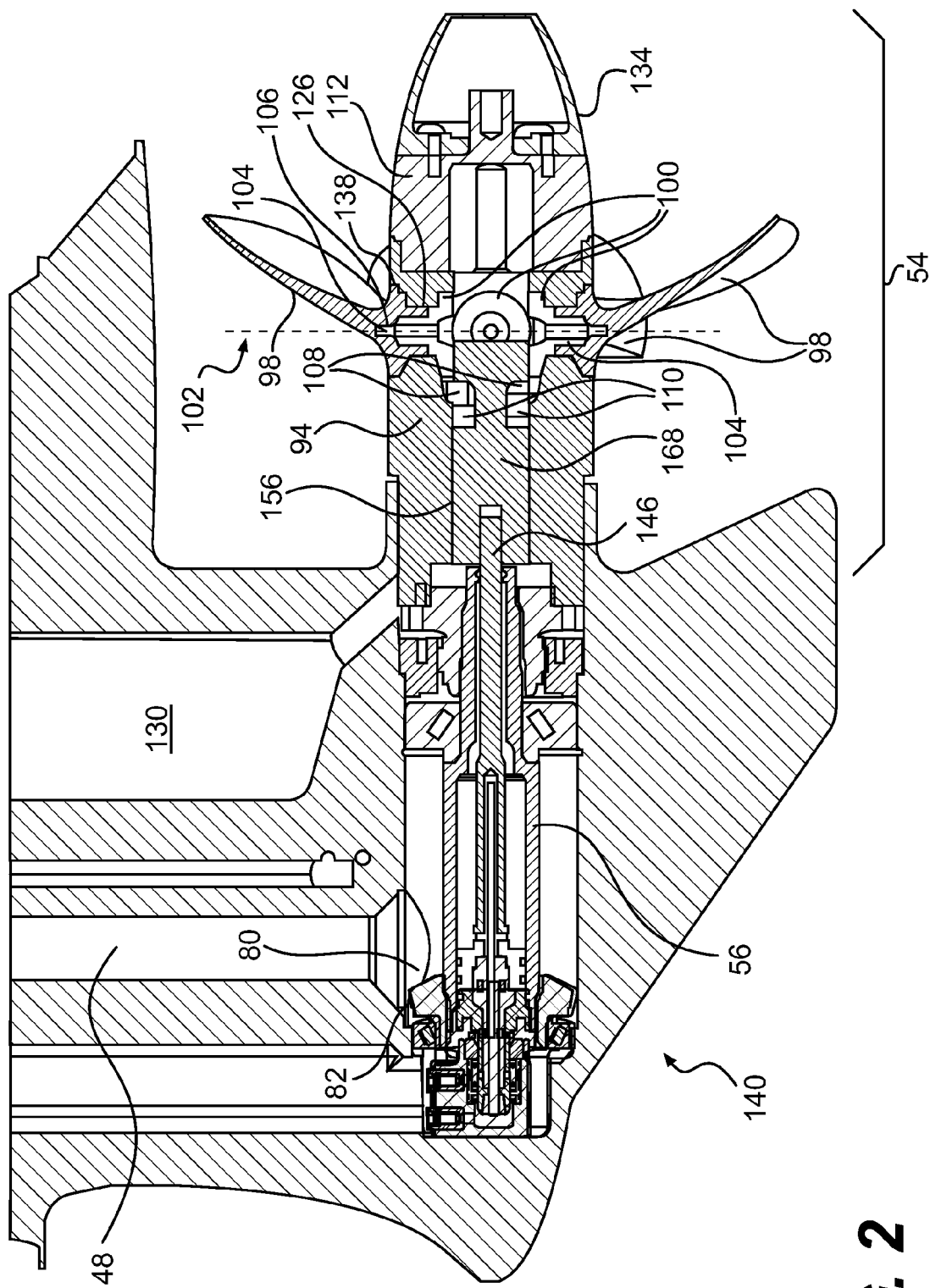
FIG. 2 is a cross-sectional view of the gear case and propeller assembly of the outboard engine of FIG. 1.

Referring to FIG. 2, the drive mechanism 50 will now be described.

A bevel gear 80 is mounted on one end of the driveshaft 48. The bevel gear 80 meshes with the bevel gear 82 that is mounted to the propeller shaft 56. The driveshaft 48 drives the propeller shaft 56 to propel a watercraft (not shown) in either the forward direction or the reverse direction, depending on the pitch of the blades 98, as will be described below in further detail. An optional transmission assembly (not shown) is capable of disengaging the engine 44 from the bevel gear 82, resulting in a neutral state wherein the propeller shaft 56 is not driven and the watercraft is no longer propelled in a body of water and can be safely boarded from the rear. A neutral state may alternatively be achieved by varying the pitch of the blades 98, as will be discussed below in further detail.

Referring to FIG. 2, an exemplary variable pitch propeller assembly 54 will now be described. It is contemplated that any other suitable variable pitch propeller assembly may alternatively be used.

The propeller assembly 54 includes four propeller blades 98 disposed at 90 degrees from each other, received in recesses 126 formed in the hub 94. Sealing rings 138 provide a water-tight seal between the hub 94 and the blades 98. Each blade 98 has a corresponding cam follower assembly 100. A D-shaped or otherwise non-circular end 104 of the cam follower assembly 100 is received in a complementarily-shaped aperture 106 in the corresponding blade 98, such that rotating the cam follower assembly 100 causes the blade 98 to pivot about the pivot axis 102 to vary the pitch of the blade 98. In this configuration, each pair of blades 98 on opposite sides of the hub 94 has coaxial pivot axes 102. It is contemplated that the blade 98 may be connected to the cam follower assembly 100 by any other suitable connection, such as a spline connection. It is further contemplated that the cam follower assembly 100 may be formed integrally with the blade 98 in a one piece construction. Each cam follower assembly 100 has a cam follower 108 that is received in a corresponding recess 110 in the cam 168. The cam follower assemblies 100 are rotated by the cam 168 in a manner that will be described in further detail below. It should be understood that more or fewer than four propeller blades 98 may be used, in which case the cam 168 would have a recess 110 corresponding to each propeller blade 98.

A spacer 112 is bolted to the rear portion of the hub 94, to allow an increased range of motion for the cam 168, as will be described in further detail below. A cap 134 is received in the rear portion of the spacer 112. The cap 134 improves the aesthetic and hydrodynamic properties of the propeller assembly 54, and provides a path for exhaust from the exhaust chamber 130 to exit via channels (not shown) in the hub 94, and spacer 112.

Figure 3:
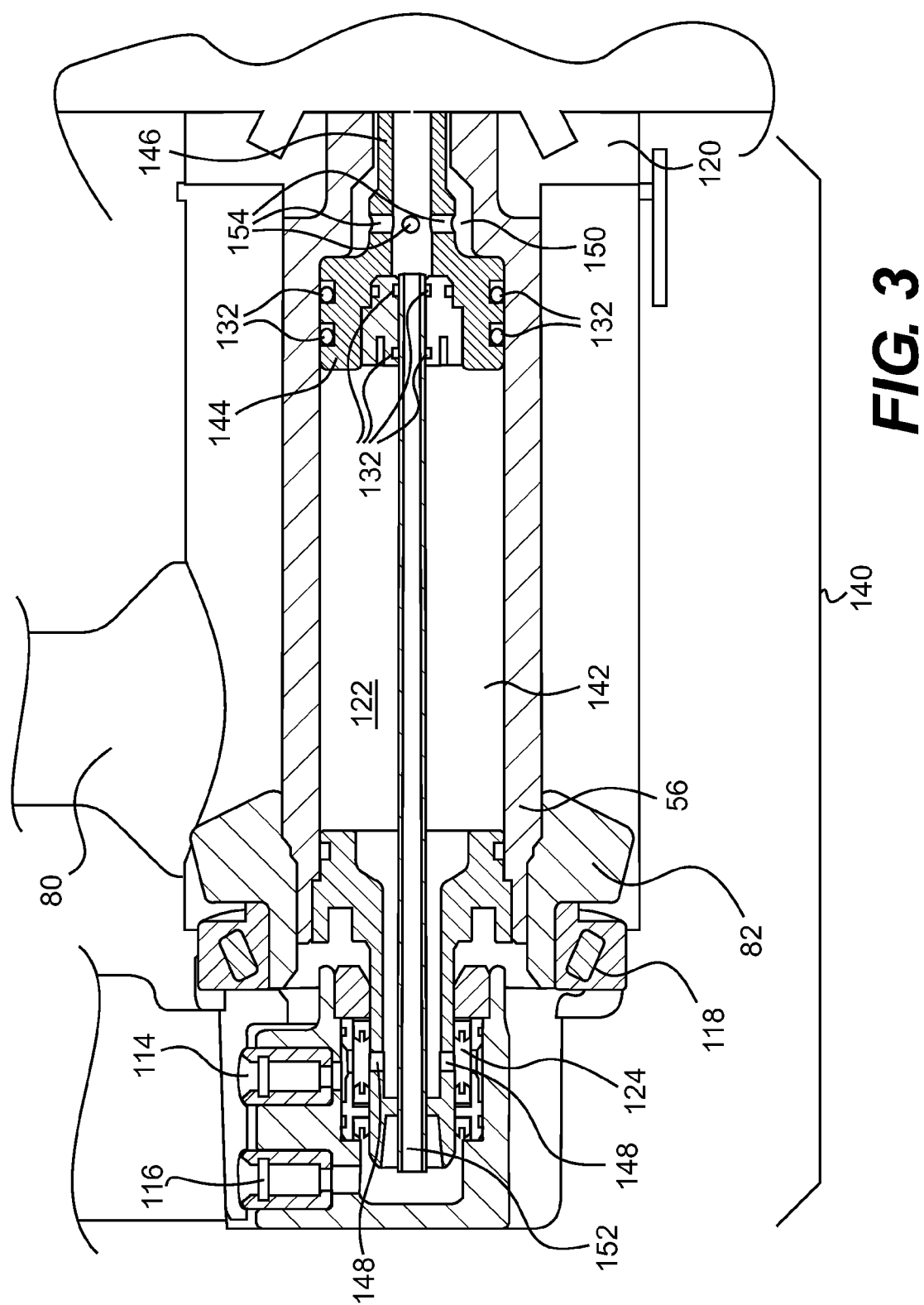
FIG. 3 is a close-up view of the gear case of FIG. 2, showing a piston thereof in a different position.

Referring now to FIG. 3, an exemplary variable pitch system will now be described. It is contemplated that any other suitable variable pitch system may alternatively be used.

The variable pitch system is operated by an actuator 140 in the form of a linear hydraulic actuator. The actuator 140 includes a housing 142 formed inside the propeller shaft 56, a piston 144 that can reciprocate within the housing 142, a shaft 146 fixed to the piston 144, and a cam 168 (FIG. 2) fixed to the rearward end of the shaft 146. The actuator 140 is coupled to a set of hydraulic valves 114 and 116, and is supported by tapered bearings 118 and 120. The hydraulic valves 114, 116 are preferably controlled by an electronic control unit (ECU) 400 (FIG. 7) to ensure precise operation of the actuator 140. The hydraulic valve 114 permits hydraulic fluid to enter the chamber 122 via the annular channel 124 and the apertures 148, to urge the piston 144 rearwardly toward the position shown in FIG. 3. The hydraulic valve 116 permits hydraulic fluid to enter the chamber 150 via the hydraulic line 152 and the apertures 154, to urge the piston 144 forwardly toward the position shown in FIG. 2. It should be understood that the valves 114, 116 could be placed at any suitable location. It is contemplated that a valveless hydraulic actuator could alternatively be used, for example by replacing the valves 114, 116 with connections to a reversible hydraulic motor controlled by the ECU 400. Operation of the reversible hydraulic motor in one direction would cause fluid to enter the chamber 122, and operation of the reversible hydraulic motor in the reverse direction would cause fluid to enter the chamber 150. Sealing rings 132 provide a seal between the piston 144, the chamber 122 and the hydraulic line 152. The reciprocating movement of the piston 144 drives the shaft 146, which extends through an end of the housing 142 to the hub 94, to drive the cam 168. The hub 94 and spacer 112 together form a channel 156 (FIG. 2) in which the cam 168 reciprocates. It is contemplated that any other suitable type of actuator 140 may alternatively be used.

Figure 4:
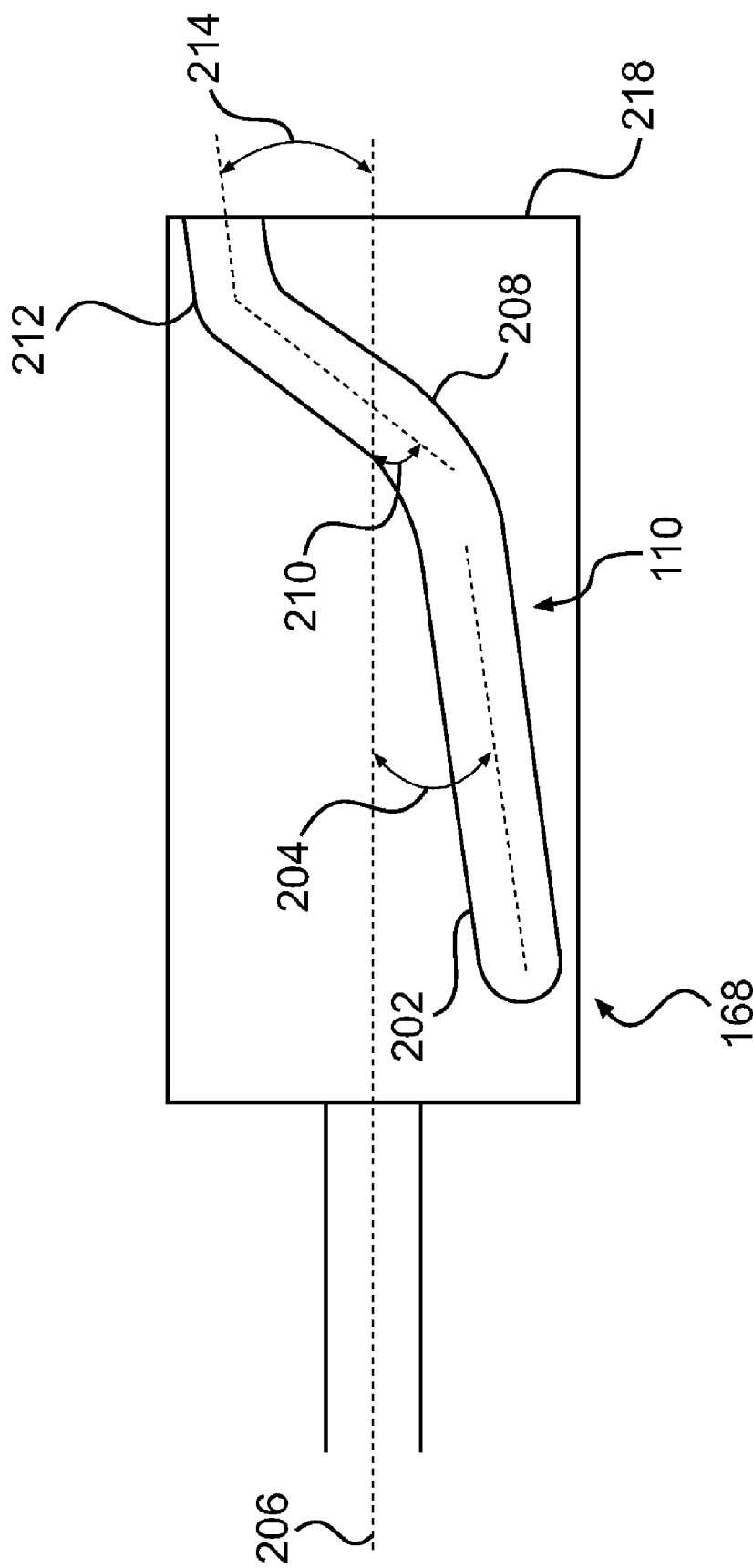
FIG. 4 is a plan view of a cam of the propeller assembly according to the present invention.

The cam 168 has four sides and has a recess 110 formed on each side thereof, one of which is shown in FIG. 4. Each of the recesses 110 has a corresponding to the propeller blade 98. One of the recesses 110 will now be described with respect to FIG. 4. A first segment 202 of the recess 110 is oriented at a first angle 204 relative to the axis 206 of the propeller shaft 56. A second segment 208 of the recess 110, disposed rearwardly of the first segment 202, is oriented at a second angle 210 relative to the axis 206 of the propeller shaft 56. A third segment 212 of the recess 110, disposed rearwardly of the second segment 208, is oriented at a third angle 214 relative to the axis 206 of the propeller shaft 56. The second angle 210 is greater than each of the first angle 204 and the third angle 214. Each cam follower 108 is received in, and engages, a corresponding recess 110. It should be understood that a propeller assembly 54 having more or fewer than four blades 98 would have a cam 168 with a corresponding number of recesses 110. For example, the propeller assembly 54 may have three blades 98 evenly spaced around the hub 94, and a three-sided cam 168 having three corresponding recesses 110.

Figure 5A:
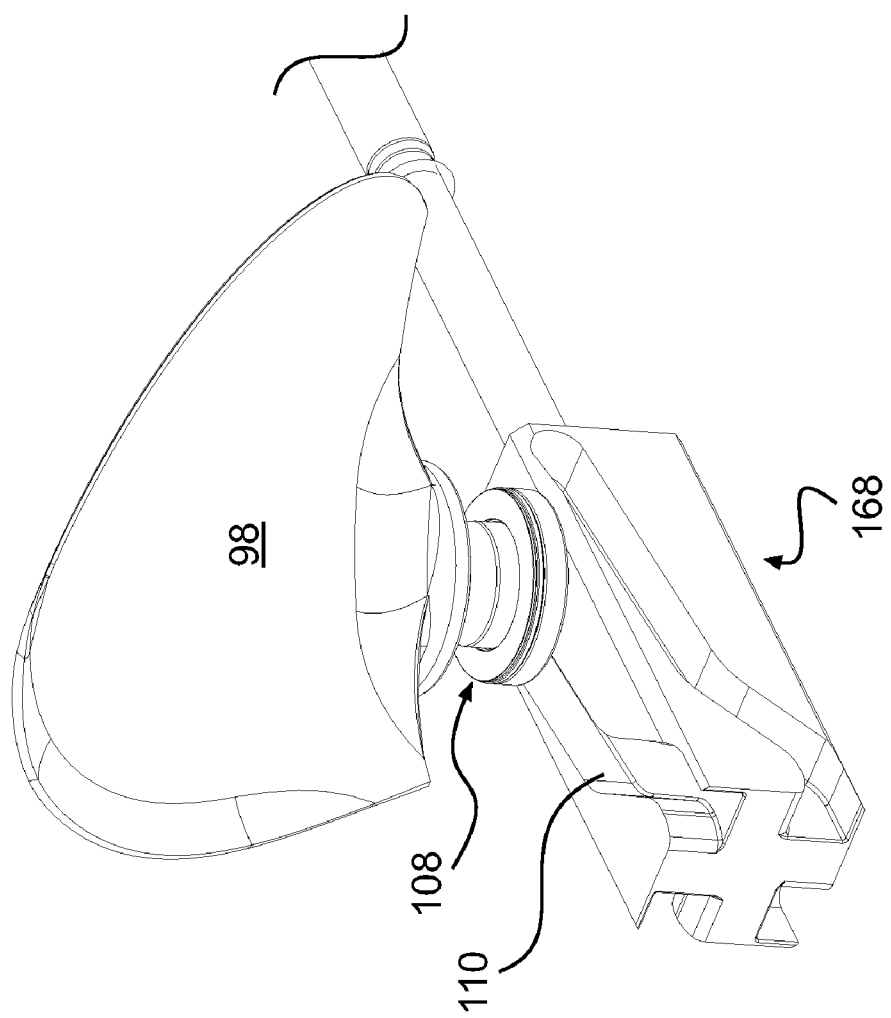

Referring to FIGS. 5A, 5B and 5C, as the cam 168 reciprocates within the channel 156 (shown in FIG. 2), the portion of the recess 110 in contact with the corresponding cam follower 108 causes the cam follower 108 to rotate, and thereby vary the pitch, of the corresponding blade 98. When the cam 168 is forwardly of a first position (shown in FIG. 5A) and rearwardly of a second position (shown in FIG. 5B), the cam follower 108 engages the first segment 202 of the cam 168. The relatively shallow first angle 204 causes the pitch of the blade 98 to vary relatively slowly as the cam 168 moves between the first position and the second position. The pitch of the blade 98 varies at a first rate that is preferably less than 1 degree per 1 mm of travel of the cam 168, and is even more preferably approximately 0.3 degrees per 1 mm of travel of the cam 168. This permits fine adjustments of the pitch of the blades 98, to achieve the desired performance characteristics while propelling the watercraft in the forward direction.

When the cam 168 is forwardly of the second position and rearwardly of a third position (shown in FIG. 5C), the cam follower 108 engages the second segment 208 of the cam 168. The relatively steep second angle 210 causes the pitch of the blade 98 to vary relatively quickly as the cam 168 moves between the second position and the third position. The pitch of the blade 98 varies at a second rate that is preferably greater than 1 degree per 1 mm of travel of the cam 168, and is even more preferably up to 3 degrees per 1 mm of travel of the cam 168. The second rate is preferably at least 5 times as fast as the first rate, and is even more preferably up to 15 times as fast as the first rate. This permits rapid shifting of the pitch of the blades 98 between the second position, in which the watercraft is propelled in the forward direction, and the third position, in which the watercraft is propelled in the reverse direction. In this manner, the watercraft can quickly and conveniently be propelled in the reverse direction by varying the pitch of the blades 98 without changing the direction of rotation of the propeller assembly 54. The increased rate of pitch change between the second and third positions reduces the degree of travel of the cam 168, allowing for a more compact arrangement.

It should be understood that there exists a pitch of the blades 98 corresponding to a zero thrust point, at which the rotation of the propeller assembly 54 provides no thrust in either of the forward or reverse directions. The zero thrust point occurs between the pitch range in which the watercraft is propelled in the forward direction and the pitch range in which the watercraft is propelled in the reverse direction, when the cam 168 is between the second position and the third position. A neutral state may therefore be achieved by setting the pitch of the blades 98 to the zero thrust pitch, without turning off the engine 44 or disengaging the engine 44 from the propeller assembly 54.

When the cam 168 is positioned forwardly of the third position, the cam follower 108 engages the third segment 212 of the cam 168. In this position, the rotation of the propeller assembly 54 propels the watercraft in the reverse direction, and the pitch of the blades 98 varies at a third rate that is less than the second rate. The third segment 212 extends to the end 216 of the cam 168, to allow the propeller assembly 54 to be assembled by sliding the cam followers 108 through the end 216 of the cam 168 into their respective recesses 110. The third angle 214 is preferably parallel to the propeller shaft, to allow for simple assembly, in which case the third rate is zero.

Referring now to FIG. 6, the outboard engine 40 is mounted to a boat 300 by attaching the stern bracket 58 to a rear portion of the deck 304. Alternatively, the outboard engine 40 could be mounted to the hull 302. It is contemplated that the boat 300 may alternatively be driven by an inboard engine or a stern drive having a variable pitch propeller, and such configurations are considered to be within the scope of the present invention. In addition, the present invention is not restricted to the particular design of the boat 300 shown. A seat 306 is provided on the deck 304 to enable a driver to be seated while operating the boat 300. A steering device, in the form of a steering wheel 308, is provided generally forwardly of the seat 306. Alternative steering devices, such as a handlebar, are contemplated. A throttle actuator in the form of a throttle lever 310 is provided within reach of the driver. The throttle lever 310 is movable between one or more forward positions, a neutral position, and one or more reverse positions, corresponding to the degree and direction of thrust desired by the driver. It is contemplated that two separate levers may alternatively be provided, with the first lever being a throttle actuator controlling a degree of thrust produced and the second lever shifting between forward, neutral, and reverse gears. It is further contemplated that a boat 300 with more than one outboard engine 40 may have one or more levers corresponding to each outboard engine 40, to allow the driver to control each outboard engine 40 independently. A velocity control actuator in the form of a pedal 312 is provided within reach of a foot of the driver. The velocity control actuator is used to control the speed, and in some embodiments the direction of travel, of the watercraft independently of the throttle lever 310. The pedal 312 is preferably biased toward an inactive position where the watercraft operates normally, and can be actuated to one or more degrees corresponding to one or more active positions indicating the degree of deceleration desired by the driver. It is contemplated that the throttle actuator and the velocity control actuator may alternatively be provided in different forms or in different locations on the boat 300, for example by providing buttons or levers on the steering wheel 308 or on a handlebar or on a console disposed forwardly of the driver. It is contemplated that the velocity control actuator could also be a lever disposed adjacent the throttle lever 310. The steering wheel 308, the throttle lever 310, and the pedal 312 are connected to the outboard engine 40 via the ECU 400 to allow the driver to control the operation of the boat 300, as will be described below in further detail. Other components of the boat 300 are believed to be well known in the art, and will not be described in detail.

Figure 7:
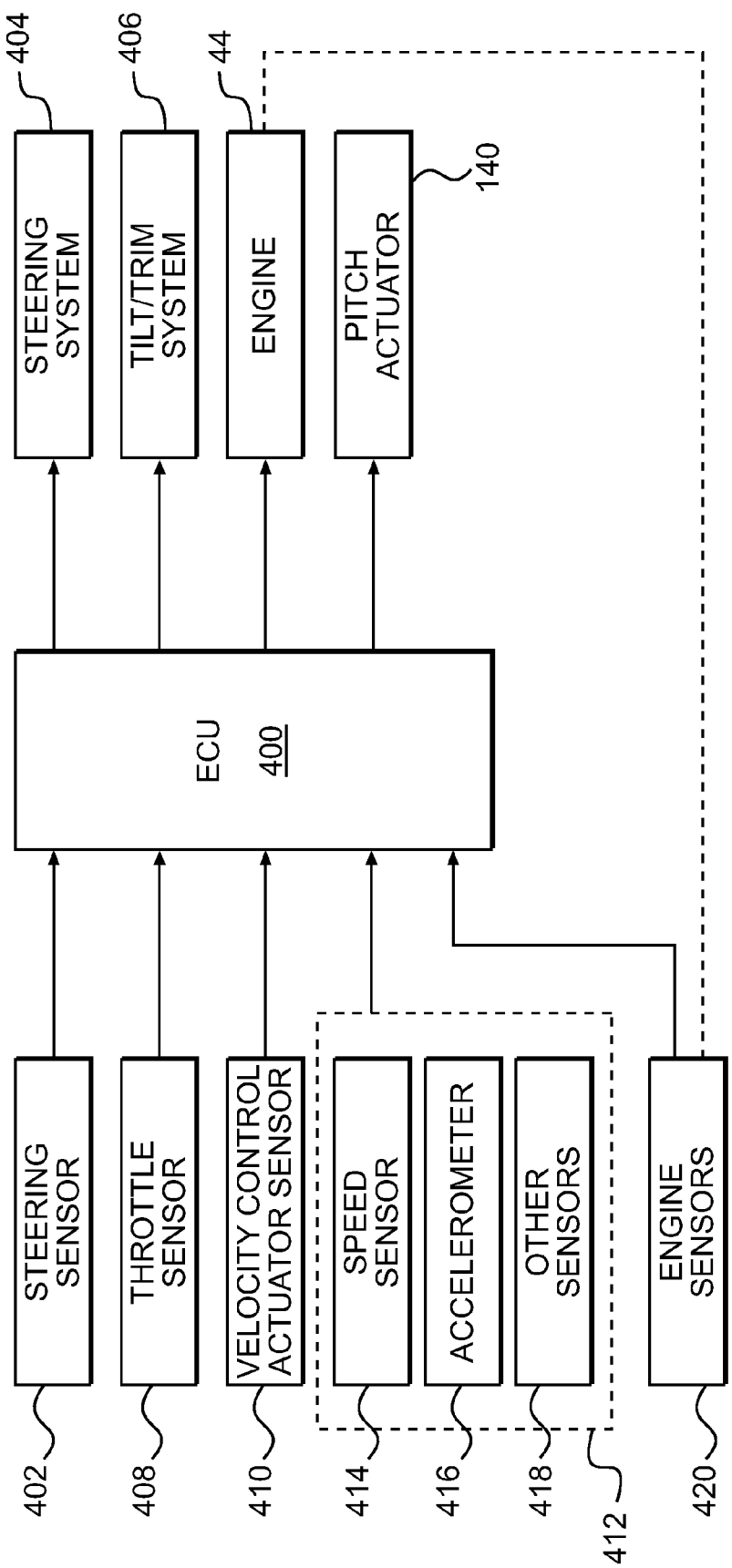
FIG. 7 is a schematic representation of an engine control unit (ECU) and of components connected thereto, in accordance with at least one embodiment of the present invention.

Referring now to FIG. 7, the ECU 400 and some of the components electrically connected thereto in accordance with an embodiment of the present invention will be described.

As seen in FIG. 7, the ECU 400 is in communication with various components of the boat 300, from which it receives signals and/or sends signals to control their operation. In the present embodiment, the ECU 400 is connected to a steering sensor 402, from which it receives signals regarding a position of the steering wheel 308. The ECU 400 is also connected to a steering system 404 of the boat 300, which may be a hydraulic cylinder or other motor (not shown) for pivoting the outboard engine 40 about a vertical steering axis with respect to the swivel bracket 59, or a rudder (not shown) of the boat 300. The ECU 400 sends signals to the steering system 404 to steer the boat 300 based at least in part on the position of the steering wheel 308. The ECU 400 is also connected to a tilt/trim system 406, which may be a hydraulic cylinder or other motor (not shown) for pivoting the outboard engine 40 about a horizontal tilt/trim axis with respect to the stern bracket 58 to vary the tilt/trim angle of the outboard engine 40. The ECU 400 is also connected to a throttle sensor 408, from which it receives signals regarding a position of the throttle lever 310. The ECU 400 is also connected to a velocity control actuator sensor 410, from which it receives signals regarding a position of the pedal 312. The ECU 400 is also connected to the pitch actuator 140, to which it sends signals to vary the pitch of the blades 98 as will be discussed below in further detail, and from which it may receive feedback signals indicative of a current pitch of the blades 98. The ECU 400 is also connected to one or more sensors 412 disposed on the boat 300. The sensors 412 send signals to the ECU 400 indicative of various operating characteristics of the boat 300. The sensors 412 include a speed sensor 414 for measuring the speed of the boat 300. The speed sensor 414 may be of any known type, including a GPS system, pitot tubes, or a paddle wheel. The sensors 412 also include an accelerometer 416 of any known design for measuring the acceleration of the boat 300. The sensors 412 include any other sensor 418 for detecting other conditions indicative of a change in vehicle speed, such as those described in U.S. Pat. No. 5,433,634, the entirety of which is incorporated herein by reference. Various types of sensors for performing these functions are known, and as such they will not be described in detail. It is contemplated that only some of the sensors 412 may be provided, or that additional sensors 412 may be provided to measure other parameters. The ECU 400 is also electrically connected various engine sensors 420 mounted on the engine 44 to receive information from regarding operating parameters of the engine 44 such as the engine speed. The ECU 400 controls the operation of the engine 44 based at least in part on the information received from the engine sensors 420 and the various other signals received by the ECU 400. It is also contemplated that the ECU 400 could detect, using some of the above sensors, cavitation generated along with the rotation of the propeller blades 98. One manner in which the ECU 400 could detect cavitation is described in United States Publication No. 2009/0215329 A1, the entirety of which is incorporated herein by reference. It is contemplated that some of these systems may alternatively not be controlled by the ECU 400. For example, the steering wheel 308 may be connected to the steering system 404 via a direct mechanical connection such as a push-pull cable.

Figure 8:
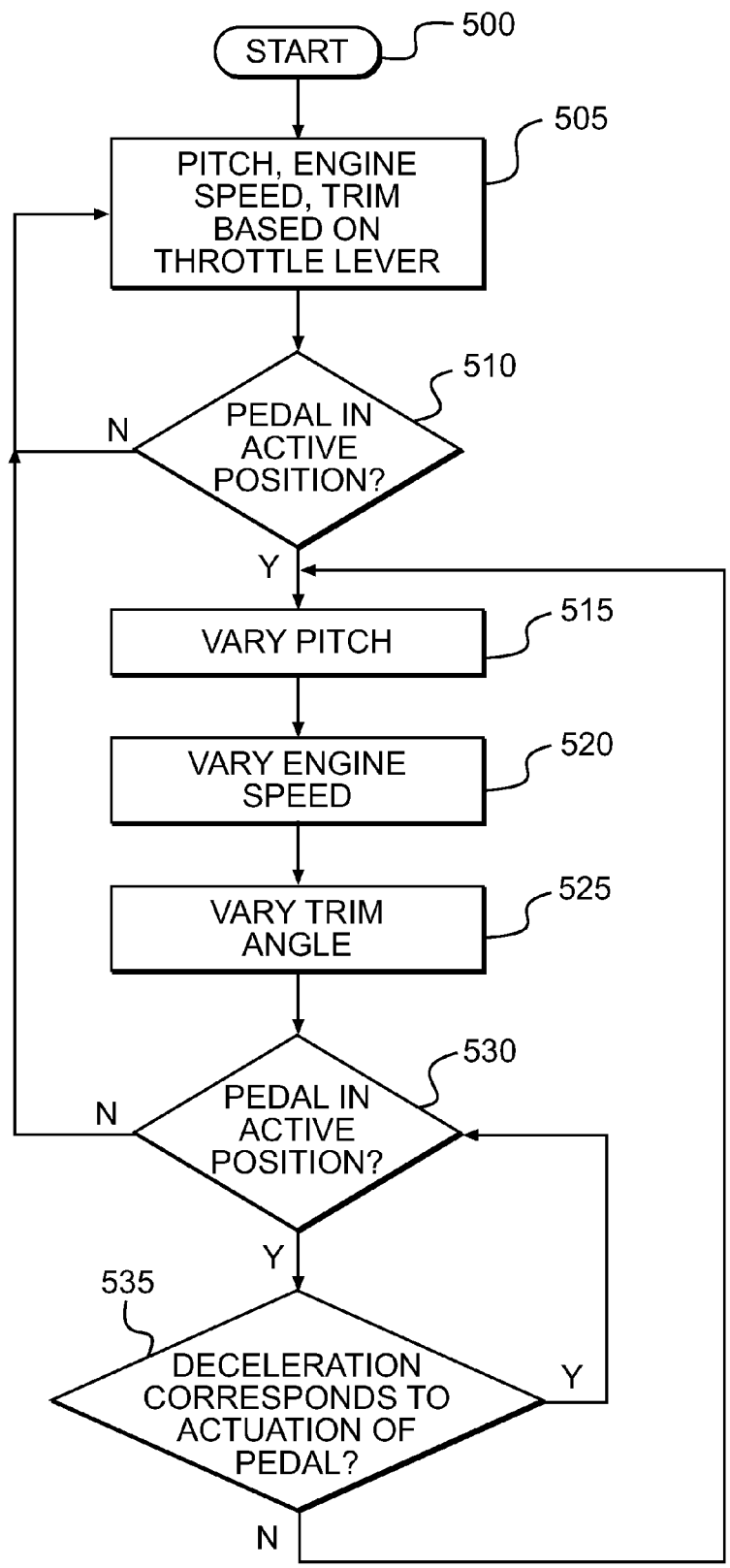
FIG. 8 is a logic diagram of the operation of a personal watercraft in accordance with an embodiment of the present invention.

Referring now to FIG. 8, a method of operation of the boat 300 will be described according to an embodiment of the invention, starting at step 500.

At step 505, the ECU 400 adjusts the blades 98 to a first pitch, causes the propeller 54 to rotate at a first propeller speed corresponding to a first engine speed, and orients the outboard engine 40 at a first trim angle. The first pitch, first propeller speed, first engine speed, and first trim angle are all preferably selected by the ECU 400 based at least in part on the driver-selected position of the throttle lever 310 to provide the desired level of performance at a reasonable level of efficiency. It is contemplated that the trim of the outboard engine 40 may alternatively be selectable by the driver independently of the ECU 400, for example by manually adjusting the trim.

At step 510, the ECU 400 receives a signal from the velocity control actuator sensor 410 and determines whether the pedal 312 is in the inactive position or one of the active positions. It is contemplated that the ECU 400 may alternatively receive a signal only if the pedal 312 is in an active position, in which case the absence of a signal would indicate that the pedal 312 is in the inactive position. If the pedal 312 is in the inactive position, the ECU 400 returns to step 505 from step 510. If the pedal 312 is in an active position, the ECU 400 proceeds from step 510 to step 515.

At step 515, the ECU 400 sends a signal to the pitch actuator 140 to vary the pitch of the blades 98 to a second pitch. The second pitch is selected based on the position of the pedal 312, such that for an equal propeller speed, the propeller 54 provides reduced thrust compared to the first pitch. If the pedal 312 is actuated to a lesser degree, the second pitch is preferably chosen to provide a slightly reduced thrust. If the pedal 312 is actuated to a greater degree, the second pitch is preferably chosen to provide a more greatly reduced thrust. If the pedal 312 is actuated to a maximum degree, the second pitch may be the neutral pitch providing no thrust, or even a reverse pitch providing reverse thrust. It is contemplated that if the second pitch is a reverse pitch, the ECU 400 may optionally reverse the direction in which the outboard engine 40 pivots about the steering axis in response to rotation of the steering wheel 308, so that the reverse thrust generated by the propeller 54 steers the boat 300 in the direction desired by the driver during deceleration. This reversal of the steering direction may not be required in some cases, for example where the reverse thrust produced is sufficiently small, or when the boat 300 has more than one outboard engine 40 such that the boat 300 can be steered by causing each engine to produce a different quantity of thrust to exert a torque on the boat 300 irrespective of whether one or more of the outboard engines 40 produce a reverse thrust. In general, any second pitch of the blades 98 between the first pitch (the pitch before deceleration begins) and the neutral pitch, or any reverse pitch, can be used to provide at least some deceleration, even if the propeller 54 continues to rotate in the same direction at the same speed. The second pitch may be selected based on the inputs of the sensors 412, for example based on calculations performed by the ECU 400 or control maps stored in the ECU 400, to provide a level of deceleration appropriate for the current speed of the boat 300. The second pitch is selected independently of the position of the throttle lever 310, so that the driver may reduce the speed of the boat 300 by actuating the pedal 312, without having to remove his hands from the steering wheel 308 to actuate the throttle lever 310. As a result, the driver can more conveniently steer the boat 300 while decelerating. The ECU 400 may optionally receive a signal from the steering sensor 402 to determine whether the driver is attempting to steer the boat 300 during deceleration. Based on this signal, the ECU 400 may restrict the second pitch to a forward pitch to provide more effective steering of the boat 300. Under certain operating conditions, it is foreseen that changing the pitch of the blades 98 could result in an increase in the speed of rotation of the propeller. Under these conditions, it is contemplated that the ECU 400 could control the engine 44 so as to prevent this increase in speed, unless the ECU 400 determines that such an increase in speed is desirable. The ECU 400 then proceeds from step 515 to step 520.

At step 520, the ECU 400 sends a signal to the engine 44 to change the speed of the engine 44 to a second engine speed, and thereby change the rotation speed of the propeller 54 to a second propeller speed. The second engine speed is lower than the first engine speed when the second pitch is a forward pitch, but may be greater than the first engine speed if the second pitch is a reverse pitch. The second engine speed may be selected based on the inputs of the sensors 412, for example based on calculations performed by the ECU 400 or control maps stored in the ECU 400, to provide a level of deceleration appropriate for the current speed of the boat 300. This change in engine speed is performed by the ECU 400 independently of the position of the throttle lever 310, such that the engine speed is changed even if the driver has not moved the throttle lever 310 from its original position before actuating the pedal 312. It is contemplated that the change in engine speed at step 520 can be performed concurrently with the change in the pitch of the blades 98 at step 515 to enhance the deceleration. In addition, the second pitch of the blades 98 selected in step 515 may be selected to provide a desired degree of deceleration based on the second engine speed.

When the second pitch of the blades 98 is a reverse pitch, cavitation may occur thus reducing the thrust which would otherwise be generated by the propeller assembly 54. In order to eliminate or at least minimize cavitation, the ECU 400 momentarily boosts the engine speed above the second engine speed and then operates the engine 44 at the second engine speed. It is contemplated that the ECU 400 could only apply this engine speed boost upon detection of cavitation by the various sensors. Alternatively, it is contemplated that the ECU 400 could apply this engine speed boost each time the pitch of the blades 98 is changed from a forward pitch to a reverse pitch.

From step 520, the ECU 400 proceeds to step 525.

At step 525, the ECU 400 sends a signal to the tilt/trim system 406 to vary the trim angle of the outboard engine 40 to a second trim angle. The second trim angle is selected such that the outboard engine 40 produces reduced thrust compared to the first trim angle. The second trim angle may be selected based on the inputs of the sensors 412, for example based on calculations performed by the ECU 400 or control maps stored in the ECU 400, to provide a trim angle appropriate for the current speed of the boat 300. The change in trim angle at step 525 can be performed concurrently with one or both of steps 515 and 520 to enhance the deceleration and maintain the boat 300 at a desired attitude during deceleration. In addition, the second pitch of the blades 98 selected at step 515 and the second engine speed selected at step 520 may be selected in combination with the second trim angle selected at step 525 to provide a desired degree of deceleration, independently of the position of the throttle lever 310. The ECU 400 proceeds from step 525 to step 530.

It is contemplated that steps 515, 520, 525 could be performed in any order.

At step 530, the ECU 400 receives a signal from the velocity control actuator sensor 410 and determines whether the pedal 312 is still in an active position. If the pedal 312 is still in an active position, the ECU 400 proceeds from step 530 to step 535. If the pedal 312 is in the inactive position, the ECU 400 returns to step 505 from step 530.

At step 535, the ECU 400 receives signals from the sensors 412 and uses these signals to determine the rate of deceleration of the boat 300. The ECU 400 compares the rate of deceleration to the degree of activation of the pedal 312, based on the signal received from the velocity control actuator sensor 410 at step 530, to determine whether the desired rate of deceleration has been produced. If the desired rate of deceleration has not been produced, either because the combined effect of steps 515, 520, 525 does not correspond to the degree of actuation of the pedal 312 determined at step 510, or because the driver has changed the degree of actuation of the pedal 312, the ECU 400 returns to step 515 and further varies one or more of the pitch, engine speed and trim angle to a third pitch, a third engine speed, and a third trim angle, respectively, as appropriate to increase or decrease the degree of deceleration. If the level of deceleration provided corresponds to the desired level of deceleration, the ECU 400 returns to step 530 from step 535.

Upon returning to step 505, in response to the pedal 312 being in the inactive position, the ECU 400 receives a signal from the throttle sensor 408 and adjusts the blade pitch, the engine speed and the trim angle to respective values corresponding at least to the degree of actuation of the throttle lever 310. If the blade pitch, engine speed and trim angle prior to entering step 505 were selected to provide deceleration, as a result of one or more of steps 515, 520 and 525, the ECU 400 may adjust these values gradually, for example according to a control map stored in the ECU 400, to provide a smoother resumption of watercraft speed and greater comfort to the passengers of the boat 300. It is contemplated that if the blade pitch, engine speed and trim angle prior to entering step 505 were selected to provide deceleration, the ECU 400 may alternatively maintain one or more of these values in a configuration that generates little or no thrust, such as maintaining the engine at an idle speed and maintaining the blades 98 in a neutral pitch, until the ECU 400 receives a subsequent signal, such as an indication that the driver has changed the position of the throttle lever 310, for example to the idle position, at which point the acceleration of the boat 300 could be governed by the throttle lever 310. In this case, once slowed the boat 300 would remain at the current reduced speed after the pedal 312 is released until the ECU 400 receives the subsequent signal.

In an alternative embodiment of the method of FIG. 8, step 515 is omitted, and as a result the ECU 400 proceeds from step 510, to step 520 directly. In another alternative embodiment of the method of FIG. 8, step 520 is omitted, and as a result, the ECU 400 proceeds from step 515 to 525 directly. It is contemplated that step 525 may also be omitted from these two alternative embodiment and from the embodiment of the method shown in FIG. 8.

Referring back to FIG. 6, in one embodiment one or more lights 314 are provided on a rearward-facing portion of the boat 300, such as on the upper motor cover 62. The ECU 400 causes the lights 314 to be illuminated in response to a deceleration of the boat 300, as indicated by the sensors 412, and/or in response to activation of the pedal 312 to indicate to other boaters that the boat 300 is decelerating.

In addition to allow the driver of the boat 300 to decelerate the boat 300, it is contemplated that a velocity control actuator, such as the pedal 312, could be used to facilitate manoeuvring the boat 300 at low speeds, such as when docking the boat 300. In such an embodiment, the ECU 400 first determines if the boat 300 is operating a low speed based on the signal for the speed sensor 414. This could alternatively be done based on the speed of the engine 44 or on the signal of the throttle sensor 408. When the ECU 400 determines that the boat 300 operates at or below a predetermined low speed, activation of the pedal 312 causes the boat to slow down and, upon sufficient activation of the pedal 312, reverse by controlling one or more of the pitch, engine speed, and trim angle as in steps 515, 520, and 525 described above. Releasing the pedal 312 resumes the operation of the boat 300 at the initial low speed. This allows the driver of the boat 300 to manoeuvre the boat 300 by keeping both hands on the steering wheel 308. It is also contemplated that the driver of the boat 300 could press a button or actuate a switch which causes the ECU 400 to limit the boat speed to the predetermined low speed and to then control the boat 300 as described above.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A watercraft comprising:
a hull;
a deck disposed on the hull;
an engine supported by at least one of the hull and the deck;
a propeller operatively connected to the engine to propel the watercraft, the propeller having a plurality of blades;
an electronic control unit (ECU) electrically connected to the engine;
a pitch actuator operatively connected to the plurality of blades and electrically connected to the ECU, the pitch actuator being operative to pivot the blades about respective pitch axes between a first pitch and a reverse pitch;
a steering device disposed on the deck for steering the watercraft;
a throttle actuator disposed on the deck and being electrically connected to the ECU; and
a velocity control actuator separate from the throttle actuator, the velocity control actuator being disposed on the deck and being electrically connected to the ECU, the velocity control actuator being movable between an inactive position and a plurality of active positions, the plurality of active positions corresponding to a plurality of degrees of actuation of the velocity control actuator,
when the velocity control actuator is in the inactive position, the ECU controlling a speed of the engine based at least in part on a degree of actuation of the throttle actuator, and the ECU causing the pitch actuator to place the plurality of blades at the first pitch, the first pitch being based at least in part on the degree of actuation of the throttle actuator; and
when the velocity control actuator is moved from the inactive position to one of the plurality of active positions:

the ECU causing the pitch actuator to place the plurality of blades at the reverse pitch, the reverse pitch being based at least in part on the degree of actuation of the velocity control actuator independently of the degree of actuation of the throttle actuator, the ECU momentarily boosting the speed of the engine when the pitch actuator pivots the blades from the first pitch to the reverse pitch, and after momentarily boosting the speed of the engine, the ECU reducing controlling the speed of the engine based at least in part on a degree of actuation of the velocity control actuator independently of the degree of actuation of the throttle actuator.

2. The watercraft of claim 1, wherein when the velocity control actuator is moved from the one of the plurality of active positions to the inactive position, the ECU causes the pitch actuator to pivot the plurality of blades from the reverse pitch to a another pitch based at least in part on a current degree of actuation of the throttle actuator.

3. The watercraft of claim 1, wherein when the velocity control actuator is moved from the one of the plurality of active positions to the inactive position, the ECU causes the pitch actuator to place the plurality of blades in a neutral pitch independently of the degree of actuation of the throttle actuator until the ECU receives a signal indicative of a change in the degree of actuation of the throttle actuator.

4. The watercraft of claim 1, wherein:
when the velocity control actuator is in one of the plurality of active positions, the ECU receives at least one signal indicative of a current rate of deceleration of the watercraft after pivoting the plurality of blades to the reverse pitch; and when the current rate of deceleration differs from a desired rate of deceleration, the ECU causes the pitch actuator to pivot the plurality of blades from the reverse pitch to another pitch in order to obtain the desired rate of deceleration.

5. The watercraft of claim 1, wherein:
when the velocity control actuator is in the inactive position, the ECU causes the propeller to be at a first trim angle, the first trim angle being based at least in part on the degree of actuation of the throttle actuator; and when the velocity control actuator is moved from the inactive position to one of the plurality of active positions, the ECU causes the propeller to be at a second trim angle, the second trim angle being based at least in part on the degree of actuation of the velocity control actuator and at least one performance characteristic of the watercraft independently of the degree of actuation of the throttle actuator.

6. The watercraft of claim 1, wherein the velocity control actuator is a pedal.

7. The watercraft of claim 1, further comprising at least one light disposed on a rearward portion of the watercraft and being electrically connected to the ECU, the ECU causing the at least one light to be illuminated in response to a signal received from the ECU indicative of at least one of a deceleration of the watercraft and of the velocity control actuator being in one of the plurality of active positions.

8. The watercraft of claim 1, wherein the velocity control actuator is biased toward the inactive position.

9. A method of controlling a watercraft, comprising:
controlling a speed of an engine of the watercraft based at least in part on a degree of actuation of a throttle actuator of the watercraft when a velocity control actuator of the watercraft is in an inactive position;

placing a plurality of blades of a propeller of a watercraft in a first pitch when the velocity control actuator of the watercraft is in the inactive position, the first pitch being based at least in part on the degree of actuation of the throttle actuator;

placing the plurality of blades in a reverse pitch when the velocity control actuator is moved from the inactive position to one of a plurality of active positions, the reverse pitch being based at least in part on the degree of actuation of the velocity control actuator independently of the degree of actuation of the throttle actuator;

momentarily boosting the speed of the engine when placing the plurality of blades in the reverse pitch; and after momentarily boosting the speed of the engine, controlling the speed of the engine in response to the velocity control actuator being moved from the inactive position to one of a plurality of active positions based at least in part on a degree of actuation of the velocity control actuator independently of the degree of actuation of the throttle actuator.

10. The method of claim 9, further comprising:
receiving at least one signal indicative of a current rate of deceleration of the watercraft after placing the blades in the reverse pitch;

comparing the current rate of deceleration to a desired rate of deceleration; and when the current rate of deceleration differs from the desired rate of deceleration, pivoting the plurality of blades from the reverse pitch to another pitch in order to obtain the desired rate of deceleration.

11. The method of claim 9, further comprising pivoting the plurality of blades from the reverse pitch to another pitch in response to the velocity control actuator being moved from one of the plurality of active positions to the inactive position, the third pitch being based at least in part on the degree of actuation of the throttle lever.

12. The method of claim 9, further comprising:
pivoting the plurality of blades from the reverse pitch to a neutral pitch in response to the velocity control actuator being moved from one of the plurality of active positions to the inactive position; and pivoting the plurality of blades from the neutral pitch to a third pitch in response to a change in the degree of actuation of the throttle lever after the velocity control actuator has been returned to the inactive position, the third pitch being based at least in part on the degree of actuation of the throttle lever.

13. The method of claim 9, further comprising:
placing the propeller at a first trim angle when the velocity control actuator is in the inactive position, the first trim angle being based at least in part on the degree of actuation of the throttle actuator of the watercraft; and placing the propeller at a second trim angle in response to the velocity control actuator being moved from the inactive position to one of the plurality of active positions, the second trim angle being based at least in part on the degree of actuation of the velocity control actuator independently of the degree of actuation of the throttle actuator.

* * * * *